United States Patent [19]
Miyamoto et al.

[11] Patent Number: 5,921,533
[45] Date of Patent: Jul. 13, 1999

[54] TABLE OPERATING DEVICE FOR MACHINE TOOL AND OPERATING METHOD FOR THE SAME

[75] Inventors: Nobuharu Miyamoto; Shinji Nakano, both of Osaka, Japan

[73] Assignee: Shinnippon Koki Kabushiki Kaisha, Osaka, Japan

[21] Appl. No.: 08/940,133

[22] Filed: Sep. 29, 1997

[30] Foreign Application Priority Data

Oct. 14, 1996 [JP] Japan .................................. 8-270867

[51] Int. Cl.$^6$ .................................................. B25B 1/00
[52] U.S. Cl. .............................................. 269/71; 269/60
[58] Field of Search .............................. 269/73, 72, 68, 269/60, 234, 217

[56] References Cited

U.S. PATENT DOCUMENTS

| | | | |
|---|---|---|---|
| 2,771,821 | 11/1956 | Beusch | 269/71 |
| 4,027,867 | 6/1977 | Pollington | 269/234 |
| 4,409,860 | 10/1983 | Moriyama et al. | 269/60 |
| 5,408,750 | 4/1995 | Teng et al. | 269/71 |
| 5,609,332 | 3/1997 | Hassell | 269/60 |

FOREIGN PATENT DOCUMENTS

470438   6/1992   Japan .

*Primary Examiner*—David A. Scherbel
*Assistant Examiner*—Daniel G. Shanley
*Attorney, Agent, or Firm*—Jordan and Hamburg LLP

[57] ABSTRACT

This invention relates to a table operating device for a machine tool having a table on which a work is mounted and a table lifting means for supporting the table and for vertically moving the table. The table operating device according to this invention has a vertically extended clamping member disposed underneath the table, a first reference plane provided on a side to the clamping member for positioning the table in a first direction on a horizontal plane; a second reference plane provided on a side to the clamping member for positioning the table in a second direction on the horizontal plane; a first pressing member for pressing the clamping member to the first reference plane; and a second pressing member for pressing the clamping member to the second reference plane.

10 Claims, 11 Drawing Sheets

TABLE OPERATING DEVICE FOR MACHINE TOOL AND OPERATING METHOD FOR THE SAME

BACKGROUND OF THE INVENTION

This invention relates to a table operating device for supporting a table of a machine tool on which a work is mounted and for vertically moving the table and also to an operating method of the table operating device.

In the conventional machine tools, it is commonly the case that a table is fixed to a bed and machining to the work mounted on the table is carried out by moving a tool in various directions with respect to the work.

With such a conventional machine tool, the tool has to be raised above the uppermost surface of the work and lower to below the lowermost surface of the work for machining, thus a stroke of the tool has to be great enough to cover at least a span between the uppermost and the lowermost. In order to set the stroke to at least cover the span, a support member for supporting a main spindle has to be increased in size, resulting in increasing the size of the machine tool as a whole that in turn reflects on the cost. Furthermore, the size increase of such as the support member in its length is likely to lower a rigidity of the support member against the torsional stress thus the negative consequence, lowering the machining precision, will likely result.

In view of the above, a device having a table lifting means for supporting a work mountable table shown in Patent Unexamined Publication No. 8-229758 is considered to be one of the countermeasure. The essential feature of such device is shown in FIG. 11 as a prior part technology to this invention.

Figure 11:
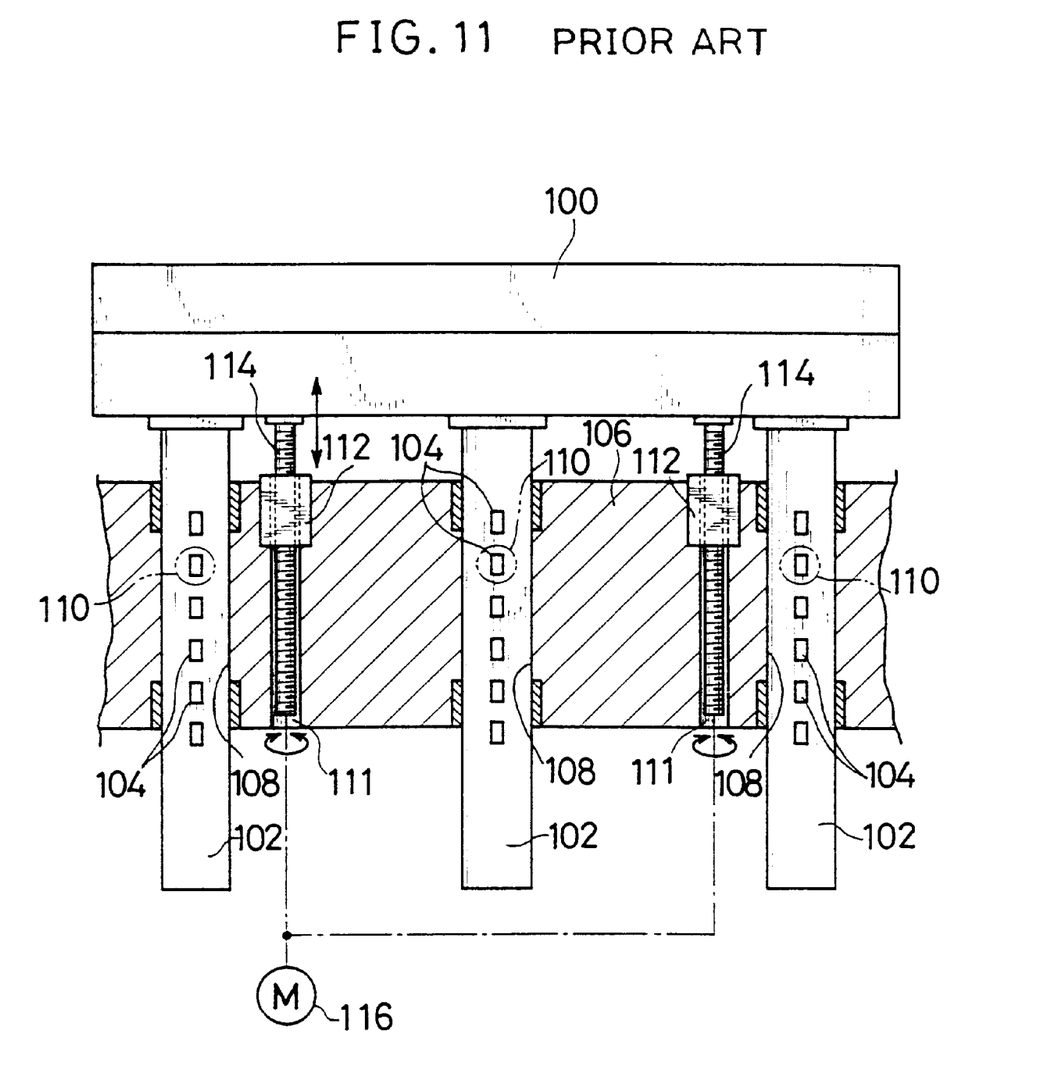
FIG. 11 is a cross sectional front view of the table operating device in the prior art.

In FIG. 11, a conventional table operating device is shown. There is shown a table 100 and a plurality of engageable members 102 extending downwardly from the lower portion of the table 100. On each engageable member 102, there is formed vertically aligned engageable holes 104. Also numeral 106 denotes a bed and a plurality of guide holes 108 for accommodating respective engageable members 102 are formed in the bed 106. An engaging cylinder 110 shown in phantom line is provided to drive its rod member to penetrate through one of the engaging holes in the engageable member 102 to fix the height of the table 100 with respect to the bed 106 when the table 100 is determined to reach a certain height position.

Table lifting means consists of a plurality of screw insertion holes 111, a nut provided in an upper part of each screw hole and a feed screw 114 is inserted through each screw insertion hole and a part of the feed screw is set in mesh with the nut 112. With thus constructed table lifting means, when the feed screw 114 is vertically displaceable by driving a motor 116 to raise and lower the table 100.

With the thus constructed device, it enables to decrease the stroke of the tool to still cover with the machining region between the uppermost and the lowermost of the work mounted on the table due to the relative movement of the work-machining surface relative to the bed. More specifically, the table 100 is adjustable in its height with respect to the floor such that at first the table 100 is positioned at its lowermost position; then the feed screw 114 is driven by the motor to raise the height of the table 100 to the desired position; once the table reaches the desired position, then the engaging cylinder 110 is activated to cause its rod member to penetrate through one of the engageable holes 104 formed on the engageable member 102 to lock the height of the table 100. Once the table 100 is stably supported by the plurality of engageable members 102, then the screws 114 are drive by the motor to lower their positions.

With the above constructed device, an insertion of the cylinder rod 110 into the engageable hole 104 realizes an accurate positioning of the table 100 in the vertical direction. However, attention should be paid to a clearance formed between the outer surface of the engageable member 102 and an inner surface of the guide hole 108. Because of this clearance, the table as a whole can be displaced horizontally by the amount of this clearance, disabling an accurate positioning of the table 100 with respect to the bed. In addition to this drawback, there is a possibility that the table 100 may be displaced during the machining operation as the rigidity of the table in the horizontal direction is relatively low. These drawbacks when combined would seriously affect the precision machining negatively. In view thereof, there certainly exists a room for improvement.

SUMMARY OF THE INVENTION

In view of the above drawbacks residing in the prior art device, it is an object of this invention to provide a table operating device of a machine tool and its operational method that enables an accurate positioning of the work mountable table in a horizontal plane while vertically moving the table.

In order to fulfill the above object according to this invention, the table operating device of the machine tool having a table on which a work is mounted and a table lifting means for supporting the table and for vertically moving the table, the table operating device comprises: a vertically extended clamping member disposed underneath the table, a first reference plane provided on a side to the clamping member for positioning the table in a first direction on a horizontal plane; a second reference plane provided on a side to the clamping member for positioning the table in a second direction on the horizontal plane; a first pressing means for pressing the clamping member to the first reference plane; and a second pressing means for pressing the clamping member to the second reference plane.

With the thus constructed device, the accurate positioning of the table in the first horizontal direction can be realized by pressing the clamping member against the first reference plane by the first pressing means. Similarly the accurate positioning of the table in the second horizontal direction can be accomplished by pressing the clamping member against the second reference plane by the second pressing means.

These and other objects, features and advantages of the present invention will become more apparent upon reading the following detailed description with reference to accompanied drawings.

DETAILED DESCRIPTION OF THE PREFERRED EMBODIMENTS

Hereinafter one of the preferred embodiments according to this invention will be described with reference to FIGS. 1–5.

Figure 1:
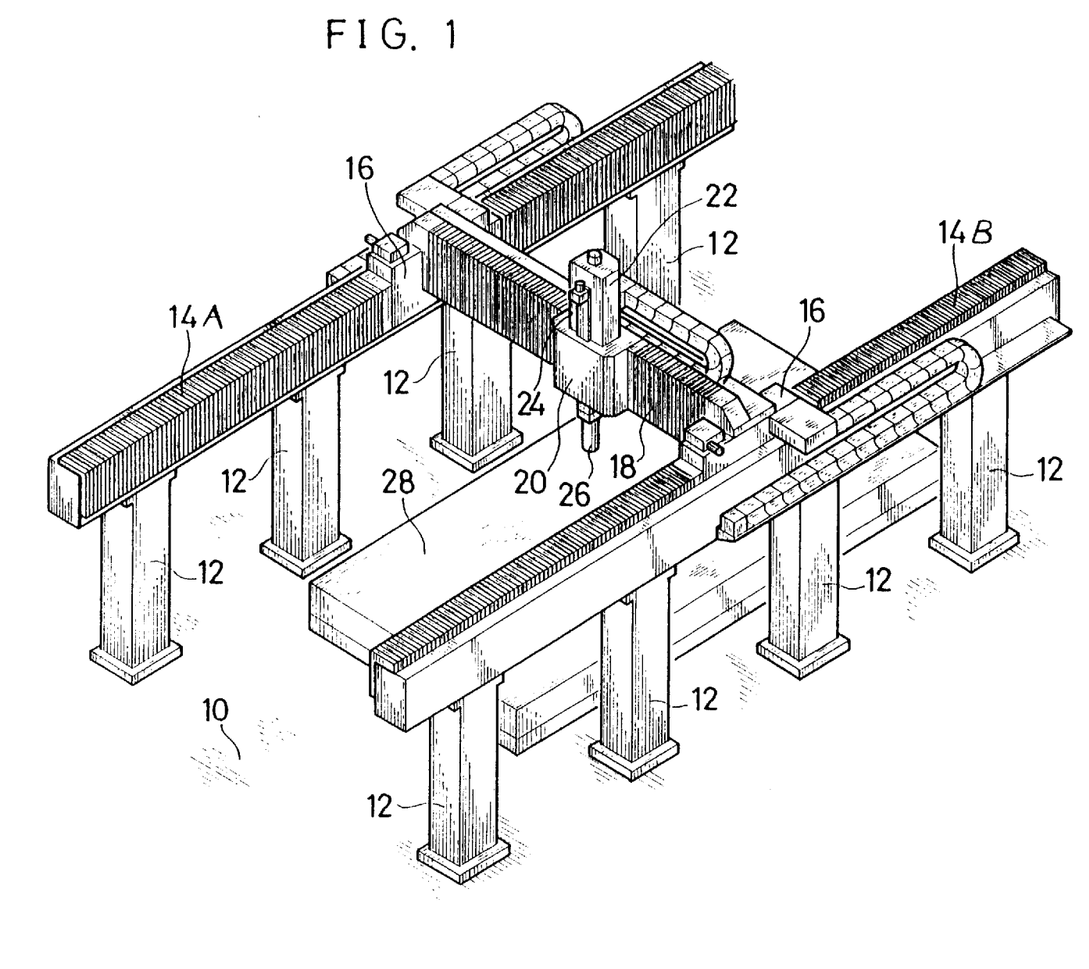
FIG. 1 is a perspective entire view of a machine tool according to the present invention.
Figure 2:
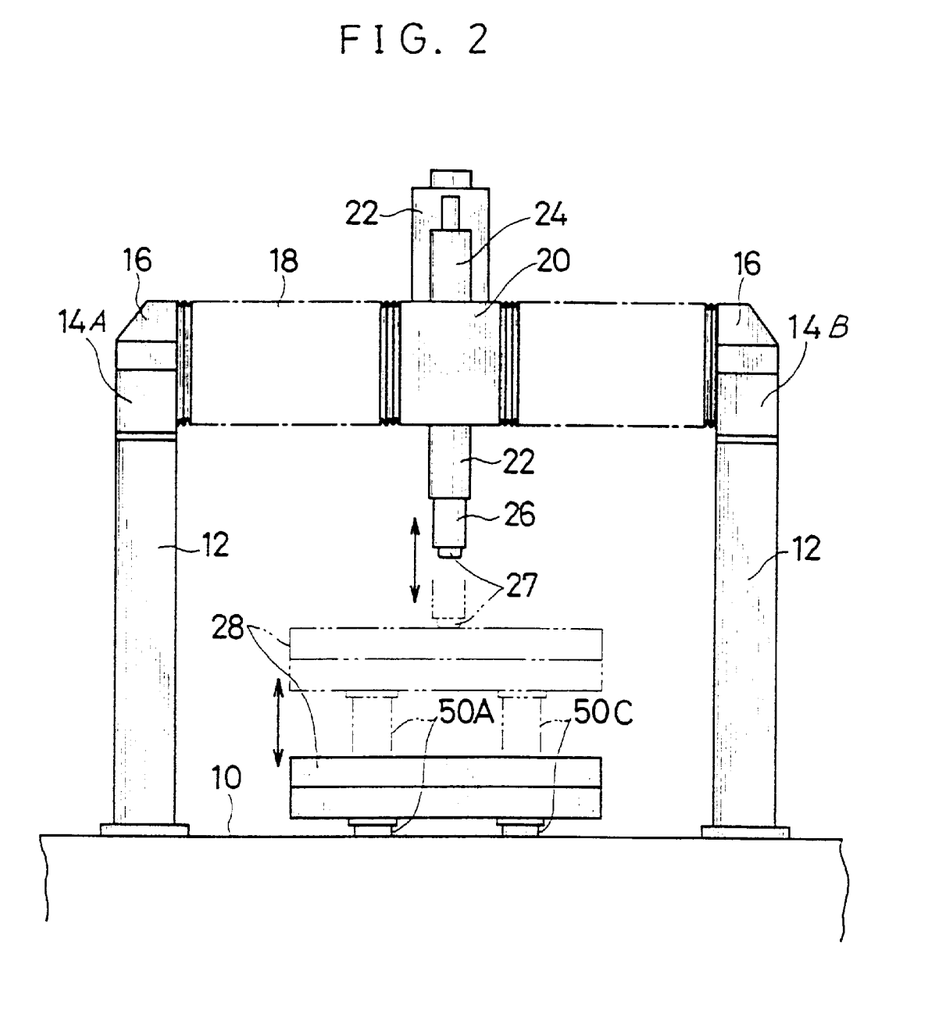
FIG. 2 is a side view of the machine tool of this invention.

As shown in FIGS. 1 and 2, a machine tool has a bed 10, a plurality of columns 12 aligned along left and right sides of the bed 10, and a beam, left one and right one 14A, 14B horizontally extending over the aligning direction of each of right and left columns and supported by the plurality of left and right sides of the columns. A motor driven slider 16 is supported on each of the beams 14A, 14B and a cross beam 18 extending over the left and right beams 14A, 14B is slidably supported by the beams via sliders 16. A slider 20 to be driven by a motor (not shown) is slidably supported on the crossbeam 18 so that the slider is driven along the longitudinal direction of the crossbeam 18. A RAM (also referred to as a tool holder) 22 is supported from the top by the slider 20 such that the tool holder 22 is vertically movable along the slider 20. The tool holder 22 supports a vertically extended main shaft and has a motor (not shown) for driving this main shaft. A chuck 26 is provided at the bottom of the main shaft to securely hold a tool 27. And the tool holder 22 is being driven vertically by a RAM lift driving means consisting of a motor (not shown) and a feed screw mechanism (not shown).

A table 28 for supporting a work thereon is provided on the bed 10 and underneath the table 28 there is provided a table operating device 30 as shown in FIGS. 3 through 8.

The table operating device 30 has a base 32 fixed on the bed 10. On this base 32, a motor 32 is provided and the output shaft of the motor 34 is connected to an input shaft of a gearbox 36 via a coupling 35. This gearbox 36 is to transmit the rotation of its input shaft to a right and a left output shafts 38, 38 extending from the gearbox 36. Each of the output shafts 38, 38 of the gearbox 36 is connected to respective input shaft 41, 41 via a respective coupling 40. Each gearbox 42 is to transmit the drive from the input shaft 41 to a fore and after directional output shaft 43. The output shaft 43 then is connected to a vertically extended screw (a feed screw) 44 via a drive transmission mechanism (not shown).

Each screw 44 is meshed with a nut provided in a bracket that is fixed on the base 32 and a table carrier 46 is provided at the top of each screw 44. Upon operation of a motor 34, all the screws 44 are simultaneously driven to rotate to raise and lower the table carriers 46. While the screw 44 is being rotated to move upward, the table carrier 46 attached to the leading end of the screw 44 is brought into contact with the lower surface of the table 28 and in turn raise the table 28 along with the upward movement of the table carrier 46.

An encoder 49 is provided in the motor 34 to detect the rotational amount (angular displacement) of the output shaft of the motor 34.

Underneath the table 28, there is fixedly provided four engageable columns 50A, 50B 50C, 50D that are positioned to form apex of a rectangle. The columns each has approximately a square cross section and has a table connecting portion 52A, 52B, 52C, 52D at the top end thereof. In addition, on the side surface of the each column, there is provided a plurality of vertically oriented recesses 54.

While on the base side 32, there is formed through holes 32a through which each of the columns 50A–50D can extend. At around periphery area of the through hole 32a, an upstanding housing 56 having a square cross section is mounted. There is formed a through hole laterally penetrating the housing 56 at the predetermined position. An engaging cylinder 58 is fixed on the side surface of the housing at the position corresponding to the through hole 56a. This engaging cylinder 58 is hydraulically operated and has an extendable rod 58a that can penetrate the through hole 58a to make engagement with one of the appropriate recesses 54 to hold the extended position of the column 50 with respect to the base 32. The cylinder 58 is changeable its state between an extended state where as mentioned above the rod penetrates one of the through holes 56a of the housing 56 and its lead end fits into one of the recesses 54 provided on the column 50A–50B to hold the vertically extended posture of the column with respect to the base 32 and a contracted state where the rod 58 is retracted from the recess 54 to allow vertical movement of the column 50A–50D with respect to the base 32. Accordingly when the four of extendable rods 58a are in the extended state, then the table 28 is supported from the bottom thereof by the columns 50A–50D.

Figure 3:
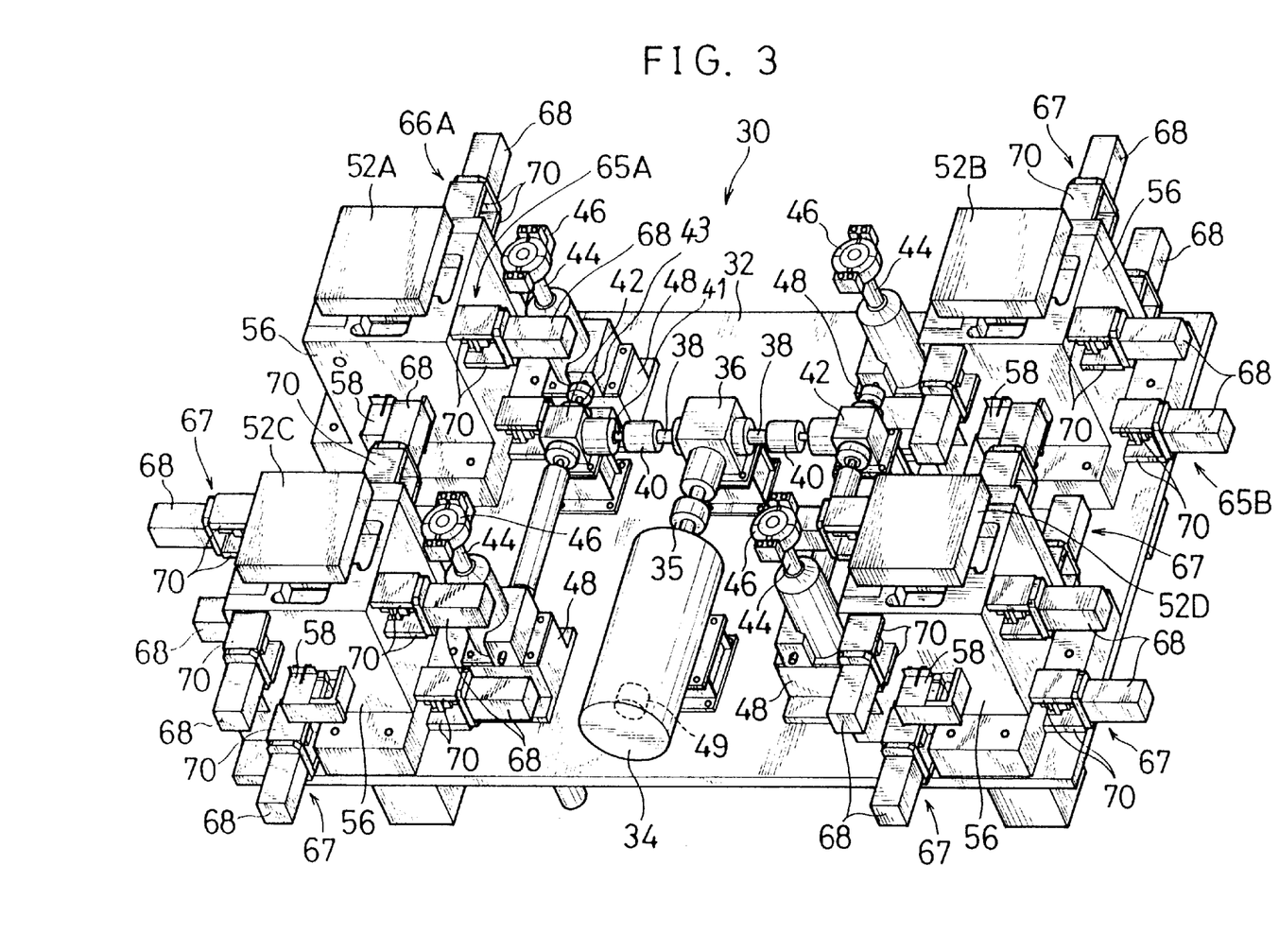
FIG. 3 is a perspective view of the table operating device provided in the machine tool.
Figure 4:
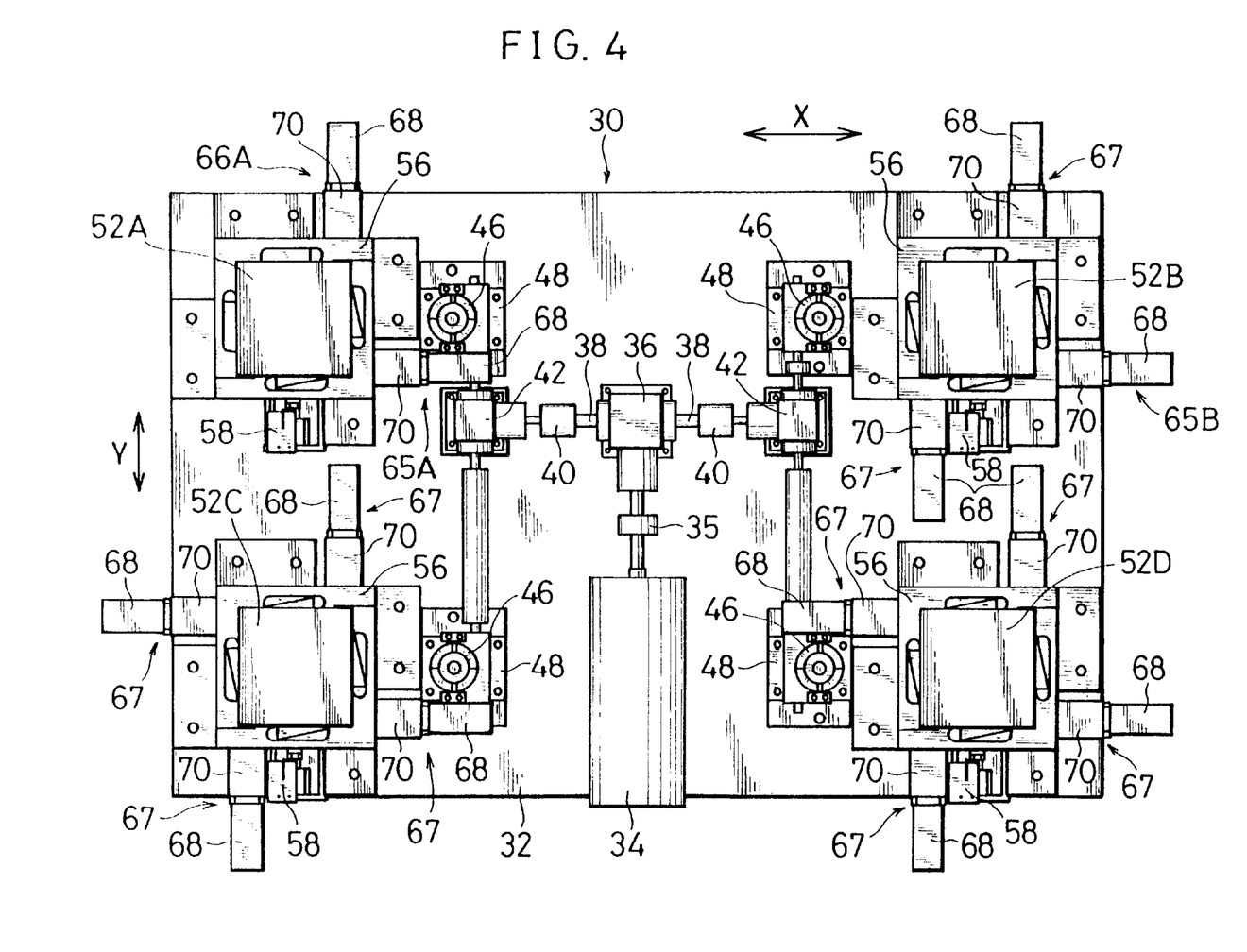
FIG. 4 is a plan view of the table operating device.

Hereinafter means for horizontally positioning each column and clamping the same will be explained with reference to FIGS. 3, 7, and 8.

A pair of up & down positioning blocks 60A, 60A, and a pair of up & down positioning blocks 61A, 61A are fixedly provided in the one of the housings with the engageable column 50A. All of these positioning blocks are fixed to the housing 56. Similarly a pair of up and down positioning blocks 60B is fixedly provided in the housing; the one used with the engageable column 50B.

Figure 5:
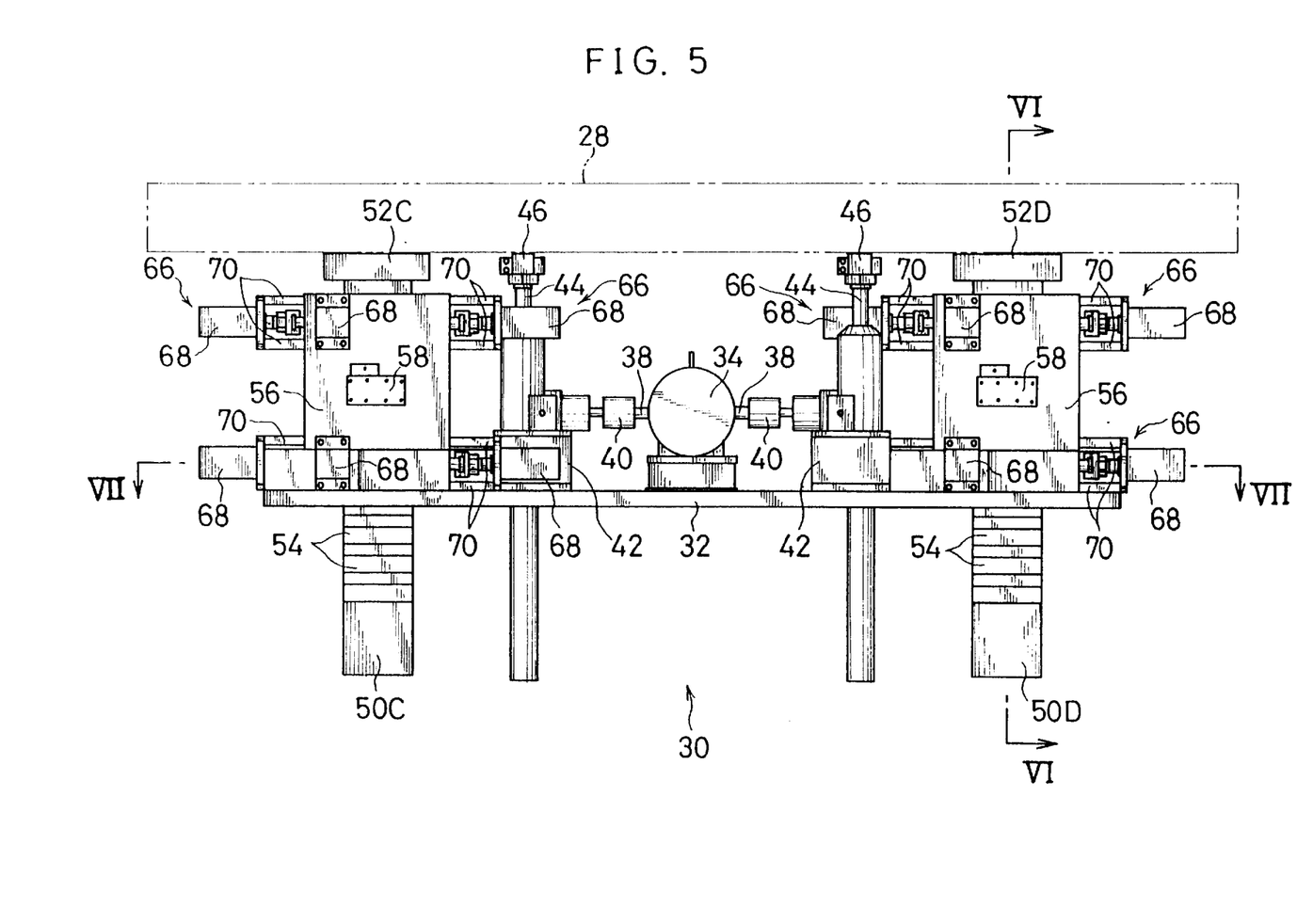
FIG. 5 is a side view of the table operating device.
Figure 6:
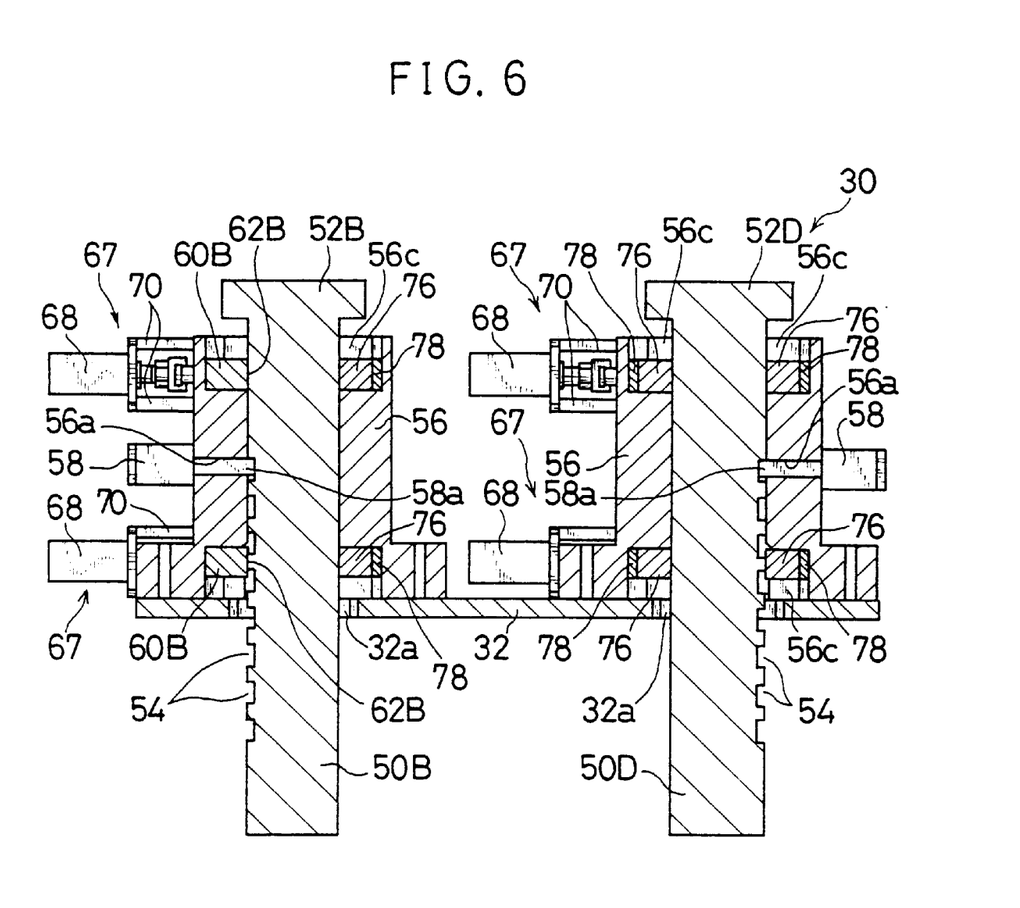
FIG. 6 is a cross sectional view of FIG. 5 taken along a line VI—VI.
Figure 7:
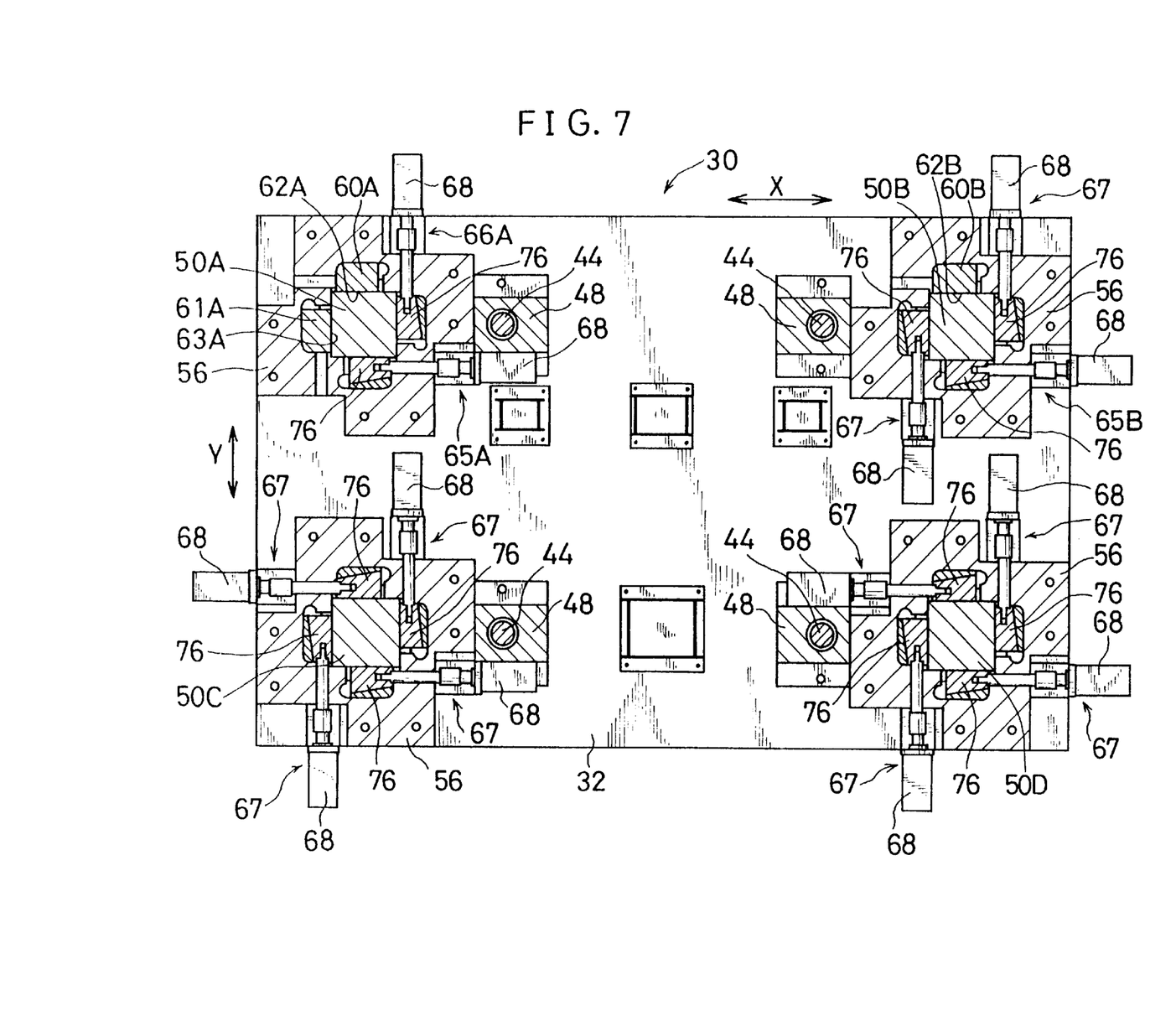
FIG. 7 is a cross sectional view of FIG. 5 taken along a line VII—VII.

Specifically the block 60A is positioned next to the columns 50A in the Y-direction as shown in FIGS. 5 and 7. So is the block 60B with respect to the column 50B. Side surface of the block 60A oriented to the column 50A is referred to as a reference plane 62A for facilitating the position adjustment of the column 50a (in the Y direction of FIG. 7) to the blocks 60A. And similarly the side surface of the block 60B oriented to the column 50B is referred to as a reference plane 62A for facilitating the position adjustment (in the Y-direction) of the column 50B to the blocks 60B. The reference planes 62A, 62B each is set orthogonal to the Y-direction, i.e., parallel to the X-direction.

As shown in FIG. 7, another block 61A is provided on the left side of the column 50A and the side surface of the block 61A oriented to the column 50A is functioning as a reference plane 63A for facilitating the position adjustment of the column 60A in the X-direction to the block 61A. The reference plane 63A is set orthogonal to the X-direction and is set parallel to the Y-direction.

A first pressing means 65A and a second pressing means 66A are provided on the opposite sides of the housing 56 (the one goes with the column 50A) to the sides facing to the blocks 60A, 61A respectively. The first pressing means 65A and the second pressing means 66A are to press the column 50A against the reference planes 62A, 63A of the blocks 60A, 61A respectively. Similarly another first pressing means is provided on the side of the housing 56 (corresponding to the column 50B) opposite from the side facing to the block 60B for pressing the column 50B against the reference plane 62B of the block 60B. Furthermore, clamping means 67 are provided on all the sides of the columns 50A–50D except for the sides facing to either one of blocks 60A, 61A, or 60B for pressing the corresponding sides of the columns against and clamping the columns at the certain positions. The structures of the pressing means 65A, 65B, 66A and the clamping means 67 are the same and shown in FIGS. 8A and 8B.

Figure 8A:
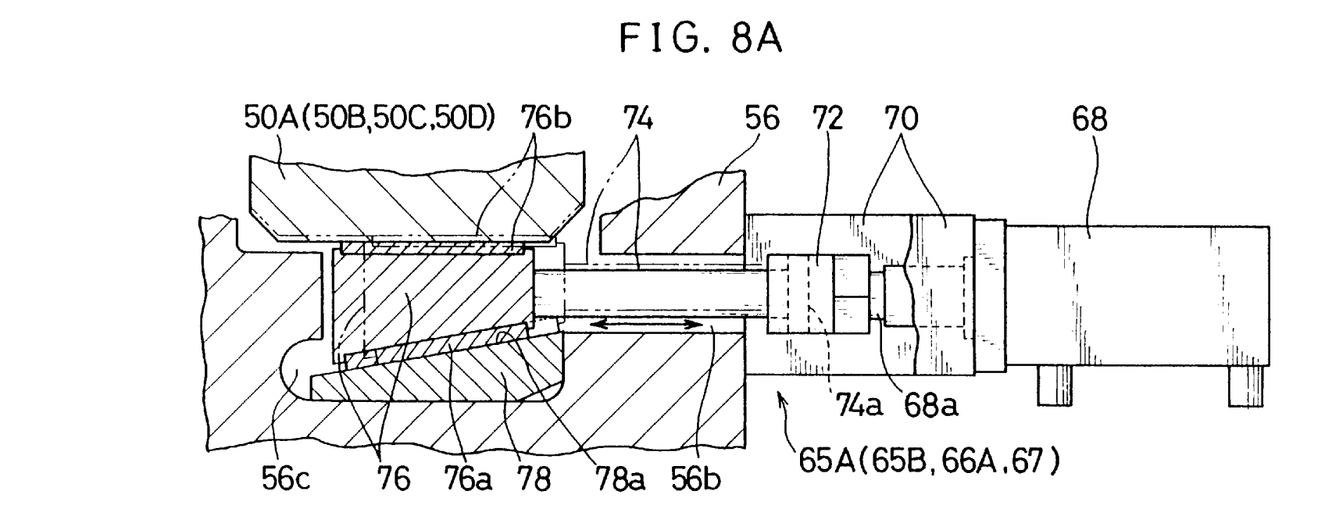
FIG. 8A is a sectional plan view in part showing pressing means and clamping means provided to the table operating device.
Figure 8B:
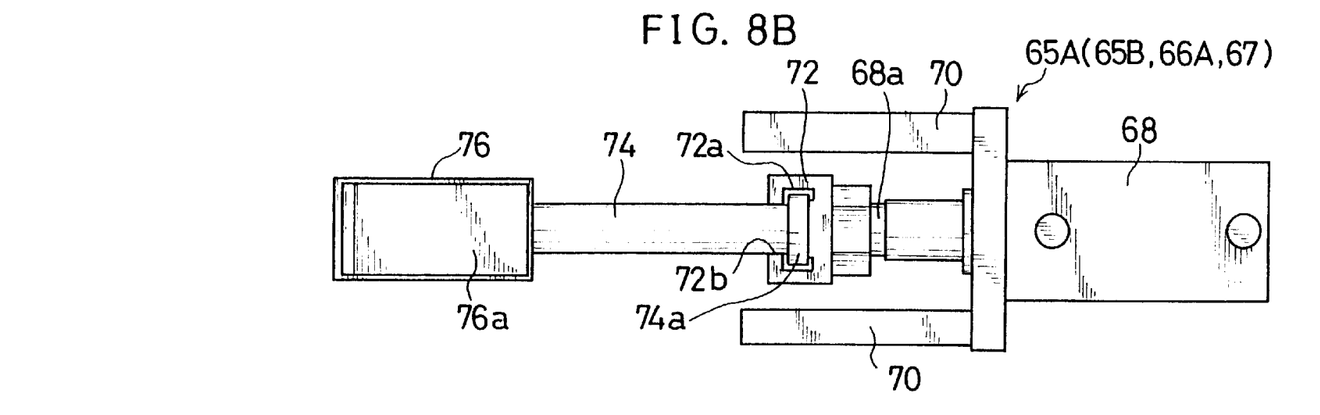
FIG. 8B is a side view showing the pressing means and the clamping means.

As shown in FIGS. 8A and 8B, a hydraulically operated press cylinder (or pressing means) 68 is fixed on the outer surface of the housing 56 via a bracket 70. A wedge member 76 is connected to the extendable head 68a via a connecting member 72 and a connecting rod 74.

The connecting member 72 is formed with a slit 72a and an opening 72a communicable to the left side of the slit 72a. On the other hand, the connecting rod is formed with a larger diameter portion on its right end (shown in FIG. 8B) that is to be fittingly placed into the slit portion 72a such that the connecting rod 74 when connected to the connecting member 72 is displaceable along its longitudinal axis along with the operation of the cylinder 68.

In more details, the wedge member 76 is fixed on the distal end of the connecting rod 74 (or a forward end; to the left in FIG. 8) that is extended through a hole formed on the housing 56 that allows communication between the inside and outside of the housing 56. The wedge member 76 is accommodated in a room 56c formed in the housing on the side of column 50A–50D. The inner surface 76b (on the top in FIG. 8A) of the wedge member 76 is formed as a plane extending along the contacting surface of the column and the outer surface 76a (on the bottom in FIG. 8A) of the wedge member 76 is formed as an inclined surface inclining towards the longitudinal direction of the connecting rod such that further away from the connection member, the wider the widthwise dimension of the wedge member (along the lateral direction) becomes.

Figure 9:
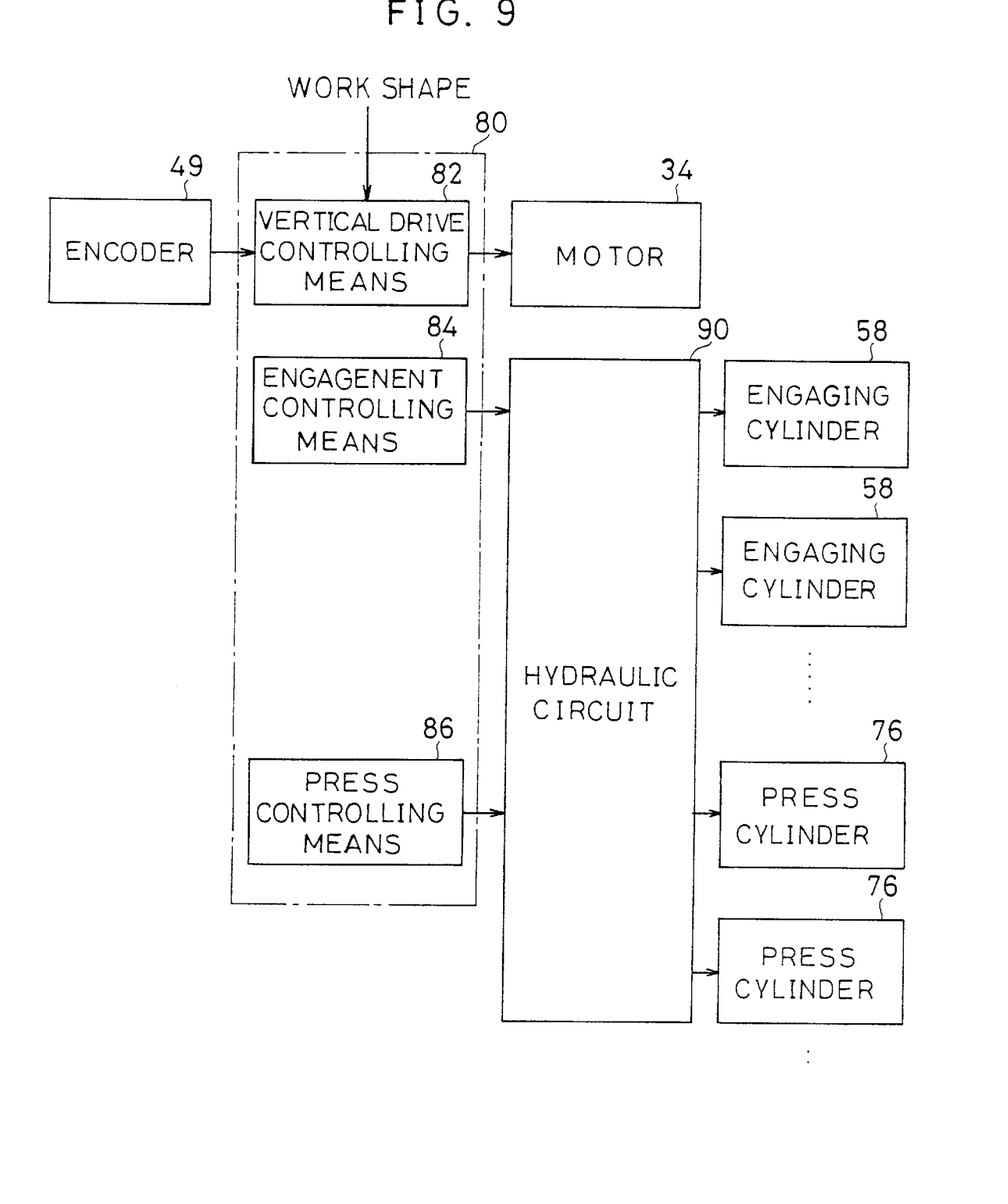
FIG. 9 is a block diagram showing functions and arrangements of a control unit provided for the table operating device.

In addition, a regulation member 76 is fixedly provided in the room 56c such that the regulation member is situated along the inclined surface of the wedge member. The surface of the regulation member facing to the outer surface of the wedge member has an inclined surface 78a having an inclination angle approximately equal to that of the inclined surface 76a of the wedge member. Thus when the press cylinder is contracted, the wedge member 76 is displaced from the position shown in solid line to the position shown in phantom line in FIG. 8A, i.e., the wedge member is press fitted between the side surface of the column 50A–50D and the inclined surface 78a of the regulation member 78. As a result, the wedge member externally presses against the side surface of the column 50A–50D. The machine tool of this invention has a control device 80 as shown in FIG. 9. The control device certainly consists of a computer as its principal element including vertical drive controlling means 82, engagement controlling means 84 and clamp controlling means 86.

The vertical movement controlling means 82 selects an appropriate recess 54 in accordance with a target height of the table 28 that is obtained by taking into consideration the input information regarding the shape and dimensions of the work. Then the means 82 controls a vertical movement of the table 28 based on the information regarding the selected recess and the signals output of the encoder 49. The detection of the vertical movement of the table is not necessarily conducted by use of the encoder as mentioned, but it may be conducted by directly detecting a movement of a pulse plate attached to the table 28 through a photoelectric sensor.

The engagement controlling means 84 outputs a signal to the appropriate control valve in a hydraulic circuit 90 that is connected to the engaging cylinder 58 and it in turn controls is each of engaging cylinders 58.

The press controlling means 86 outputs a signal to the appropriate control valves in the hydraulic circuit 90 that are connected to respective press cylinders 72 for controlling longitudinal movement (extension and contraction) of each press cylinder 76 (i.e., to carry out a press controlling of the respective engageable columns 50A–50D).

Figure 10:
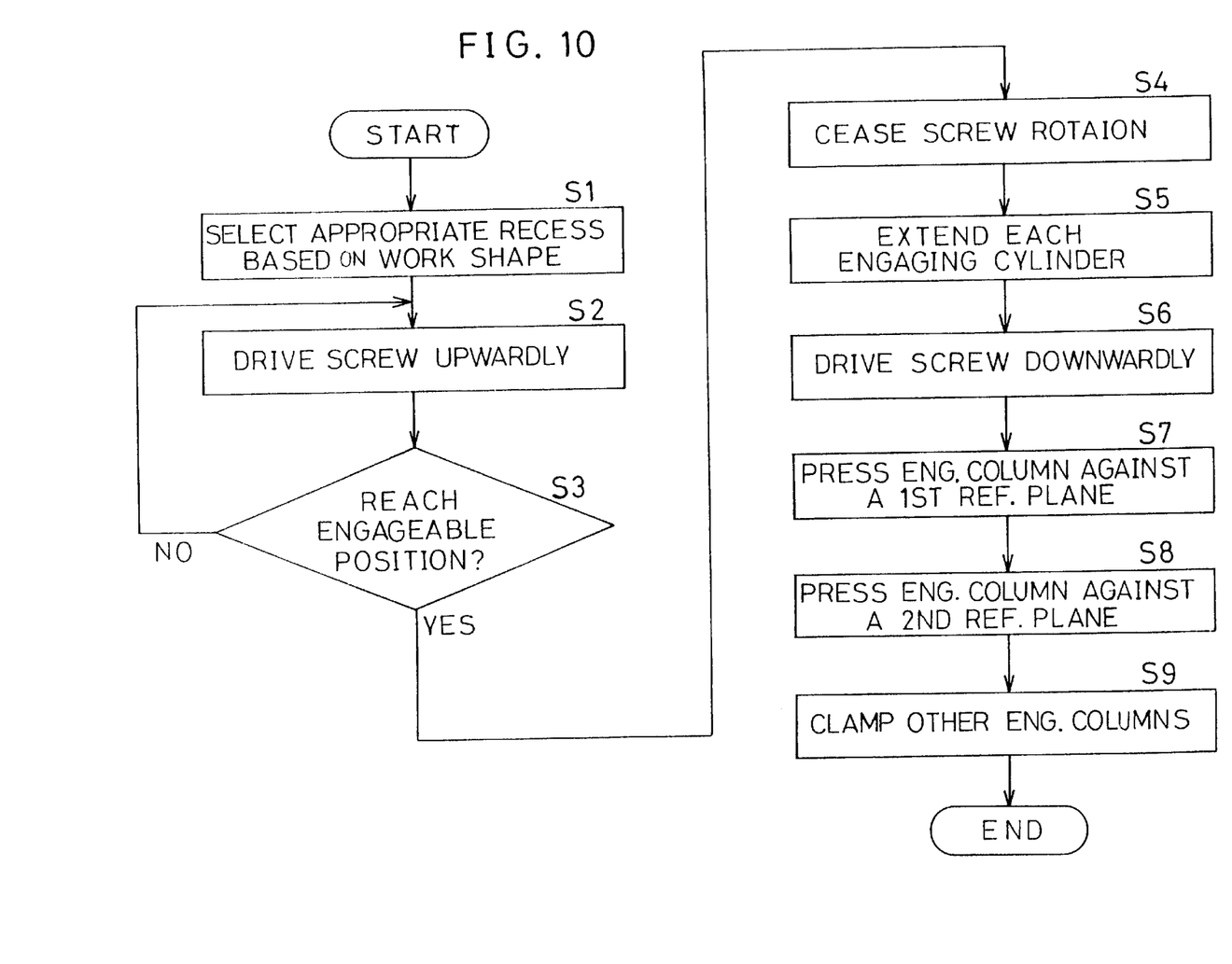
FIG. 10 is a flowchart showing operational steps of the control unit.

Hereinafter we will explain operations and effects of the device as a whole with reference to a flowchart shown in FIG. 10. It should be noted that before advancement to Step S1, it is assumed that as an initial condition of the device, the screw 44 is positioned at the lowermost position, all the engaging cylinders are in contract state and all the press cylinders 76 are in the extended state.

At step S1: Most adequate recess 54 is selected so that it enables the optimum machining height of the table 28 based on the information regarding the shape and dimensions of the work to be placed and machined on the table 28.

At step S2: Operate a motor 34 to drive each screw 44 to rotate in the direction that is to raise each screw 44. Upon driving of the screw 44 to rotate in the direction to raise the leading end thereof until the table lifter 46 provided at the leading end of the screw 44 makes a contact with the lower surface of the table 28 and further continue the driving of each screw to lift the table 28.

At steps S3 and S4: Continue the driving of the screws 44 till the table 28 reaches at a point where the distal end of the extendable rod 58a (of the engaging cylinder 58) is fitted to the recess selected at the step S1 and stop the rotation of the screw 44 when the table reaches at the point thereby the table 28 is temporarily held at the engageable position.

At step S5: Each of the engaging cylinders 58 is driven to effect its extended posture to place the leading end of each cylinder to corresponding engageable recess 54 formed on the respective column.

At step S6: Drive the motor 34 to rotate to the opposite direction to the Step S2 for lowering each of screws 44. This in turn moves the table carriers 46 downward from the lower surface of the table 28 to realize the state where the table 28 is supported by the columns whose respective recesses 54 are engaged by the extendable rods 58a (of the engaging cylinders 58). This enables an height adjustment of the table 28 (i.e., a vertical positioning of the table 28 is done); however, the horizontal positioning of the table 28 is not yet done as there exists a clearance between the side surfaces of the columns 50A–50D and corresponding inner surfaces of the housings 56.

At step S7: Drive two of first press means 65A, 65B of the press cylinders 76 corresponding to the column 50A and the column 50B respectively to effect their contracted state for squeezing the respective wedge members between the side surfaces of the columns 50A, 50B and the respective inclined surfaces 78a of the regulation members 78. By the movement of the wedge members 76, the engageable columns both 50A, 50B are pressed against the reference planes 62A, 62B of the blocks 60A, 60B respectively. This completes the positioning of the table 28 in the Y-direction.

At step S8: Drive the second pressing means 66A of the press cylinder 76 to effect its contracted state. In so doing, the engageable column 50A is pressed against the second reference plane 63A. This then completes the positioning of the table 28 in the X-direction (FIGS. 5 & 7). As a result, horizontal positioning of the table 28 is completed.

At step S9: Drive each of the press cylinders 76 (as clamping means 67) to effect its contracted state. In so doing, the engageable columns 50B is clamped against the X-direction and the engageable columns 50C, 50D are clamped from both X and Y directions thereby enhancing the rigidity of the table 28 in its supported state. As a result, the precision machining of the work placed on the table 28 can be performed.

Summing up the preferred embodiments of this invention described in the above, the table operating device comprises a vertically extended clamping member disposed underneath the table, a first reference plane provided on a side to the clamping member for positioning the table in a first direction on a horizontal plane; a second reference plane provided on a side to the clamping member for positioning the table in a second direction on the horizontal plane; a first pressing means for pressing the clamping member to the first reference plane; and a second pressing means for pressing the clamping member to the second reference plane.

With thus constructed device according to this invention, the accurate positioning of the table in the horizontal plane can be realized by pressing the clamping members against the respective reference planes. Furthermore, the rigidity of the table in the same plane can be enhanced, thus it leads to improve the precision machining of the work placed on the table.

Then the first pressing means may be formed with a regulating member having an inclined surface whose horizontal distance to the side surface of the clamping member varies depending upon a position in the inclined surface; a wedge member press fittingly disposed between the inclined surface and the side surface of the clamping member; and a pressing means for press fittingly disposing the wedge member between the inclined surface and the side surface of the clamping member.

With this structure, the greater pressing force can be generated by the relatively smaller operating force of the pressing means thanks to the wedge effect thus it is possible to securely press the clamping member against the reference plane. This structure has an advantage of enabling a smaller and inexpensive device to secure greater pressing force for realizing accurate positioning of the table.

Furthermore, only one or a plurality of the clamping members may be provided for the table. In the latter case, the first pressing means may be set to press at least one of the clamping members against the first reference plane and the second pressing means to press at least one of the pressing members against the second reference plane. That is also possible to provide a set of first reference plane and the first pressing means for each clamping member and to enhance positioning accuracy. With this arrangement, the positioning accuracy can be further enhanced as compared with the single clamping members with the first reference plane.

It is also possible to have a clamping unit for clamping the clamping members, which are not pressed against the reference planes, from both sides on the horizontal plane. With this arrangement, the rigidity of table when clamped is further enhanced. In this case, subsequently to the pressing operations by the first and second pressing means, the above mentioned clamping unit should be operated.

In addition, the clamping members each may be in a form of a vertically extended engageable member and the engageable members are aligned on the horizontal plane, and each engageable member has vertically aligned plural engageable recesses and the engaging member is changing its state between an engaging state for engaging with an arbitrary one of the engageable recesses to support the table and a non-engaging state for retrieving from the engageable recess. With this structure, the clamping member is functioning also as the engaging member. Thus using the above clamping member enables an adjustment of the table in a horizontal direction and a vertical direction.

Another Embodiments of this Invention

Note that this invention is not limited to the specific embodiments described above along with the drawings, thus the following alternatives can be readily available without departing from the sprit of this invention.

(1) The means to press each columns 50A–50D is not limited to the wedge shaped member 76 as described in the above passages but is possibly in the form of hydraulic cylinder with the extendable rod that can directly press the column perpendicularly. However, the use of the aforementioned wedge shaped member 76 as described generates a higher pressing force to the side surface of the column even with a relatively smaller hydraulic cylinder.

(2) In the foregoing embodiments, clamping means are provided on all the sides of the columns 50A–50D that are not facing to the reference planes. However, it may be possible to exclude some or all of the clamping means on the sides of the columns that are not facing to the reference planes to still effect the reliable positioning of the table on the horizontal surface. Needless to say further enhancing the rigidity of the table when it is held, the clamping means are preferably provided on the sides of the columns that are not facing to the reference planes.

(3) In the foregoing embodiment, the engageable columns are used to be clamped by the clamping means; however, another member extending downwardly from the lower surface of the table 28 may be used as the members to be clamped and pressed against the reference planes to achieve the same result intended by this invention.

(4) In the foregoing embodiment, a plurality of first reference planes are used; however, this may be a singular reference plane to still realize reliable horizontal positioning of the table. However, by providing the plural reference planes at the positions apart from each other, it further enhances the accuracy of positioning. Furthermore, the number of the clamped portions and arrangement thereof are not necessarily limited to the foregoing embodiment but are rather designed freely. In addition, the order of pressing the columns against the reference planes are not to be limited by the one described in the above; thus for instance, pressing the column against the second reference plane first is permissible. Furthermore, simultaneous pressing the columns against both the first and the second reference planes is permissible as well.

Although preferred embodiments of the present invention have been fully described with reference to the accompanied drawings, it is to be understood that various changes and modifications will be apparent to those skilled in the art. Therefore, unless otherwise such changes and modifications depart from the spirit and scope of the invention, they should be construed as being included therein.

What is claimed is:

1. A table operating device for a machine tool having a table on which a work is mounted and a table lifting means for supporting the table and for vertically moving the table, the table operating device comprising:

a vertically extended clamping member disposed underneath the table, a first reference plane provided on a side to the clamping member for positioning the table in a first direction on a horizontal plane;

second reference plane provided on a side to the clamping member for positioning the table in a second direction on the horizontal plane;

first pressing means for pressing the clamping member to the first reference plane; and a second pressing means for pressing the clamping member to the second reference plane.

2. The table operating device for the machine tool according to claim 1, wherein a plurality of the clamping members are provided for the table and the first pressing means presses at least one of the clamping members against the first reference plane and the second pressing means presses at least one of the pressing members against the second reference plane.

3. The table operating device for the machine tool according to claim 1, wherein the first pressing means including:

a regulating member having an inclined surface whose horizontal distance to the side surface of the clamping member varies depending upon a position in the inclined surface;

a wedge member press fittingly disposed between the inclined surface and the side surface of the clamping member; and pressing means for press fittingly disposing the wedge member between the inclined surface and the side surface of the clamping member.

4. The table operating device for the machine tool according to claim 3, wherein a plurality of the clamping members are provided for the table and the first pressing means presses at least one of the clamping members against the first reference plane and the second pressing means presses at least one of the pressing members against the second reference plane.

5. The table operating device for the machine tool according to claim 4, further comprising an engaging member and wherein the clamping members each is a vertically extended engageable member and the engageable members are aligned in the horizontal plane, and each engageable member has vertically aligned plural engageable recesses thereon and the engaging member is changing its state between an engaging state for engaging with an arbitrary one of the engageable recesses to support the table and a non-engaging state for retrieving from the engageable recess.

6. The table operating device for the machine tool according to claim 4, further comprising a clamping unit for clamping the clamping members, that are not pressed against the reference planes, from both sides on the horizontal plane.

7. The table operating device for the machine tool according to claim 4, wherein a plurality of the clamping members are provided along a direction parallel to the first reference plane and the first reference plane and the first pressing means respectively are provided for each of the clamping members.

8. The table operating device for the machine tool according to claim 7, further comprising a clamping unit for clamping the clamping members, that are not pressed against the reference planes, from both sides on the horizontal plane.

9. The table operating device for the machine tool according to claim 7, further comprising an engaging member and wherein the clamping members each is a vertically extended engageable member and the engageable members are aligned in the horizontal plane, and each engageable member has vertically aligned plural engageable recesses thereon and the engaging member is changing its state between an engaging state for engaging with an arbitrary one of the engageable recesses to support the table and a non-engaging state for retrieving from the engageable recess.

10. The table operating device for the machine tool according to claim 9, further comprising a clamping unit for clamping the clamping members, that are not pressed against the reference planes, from both sides on the horizontal plane.

* * * * *